(12) United States Patent
Duesel, Jr. et al.

(10) Patent No.: US 8,136,797 B2
(45) Date of Patent: Mar. 20, 2012

(54) COOLING TOWER

(75) Inventors: Bernard F. Duesel, Jr., Goshen, NY (US); Michael J. Rutsch, Tulsa, OK (US)

(73) Assignee: Heartland Technology Partners, LLC, St. Louis, MO (US)

( * ) Notice: Subject to any disclaimer, the term of this patent is extended or adjusted under 35 U.S.C. 154(b) by 1050 days.

(21) Appl. No.: 11/625,022

(22) Filed: Jan. 19, 2007

(65) Prior Publication Data
US 2008/0173031 A1 Jul. 24, 2008

(51) Int. Cl.
*B01F 3/04* (2006.01)
(52) U.S. Cl. ............. 261/77; 261/123; 261/124; 96/189
(58) Field of Classification Search .............. 261/77, 261/121.1, 122.1, 123, 124, DIG. 9; 96/189
See application file for complete search history.

(56) References Cited

U.S. PATENT DOCUMENTS

| | | | |
|---|---|---|---|
| 2,387,818 A * | 10/1945 | Wethly | 422/241 |
| 2,468,455 A * | 4/1949 | Metziger | 23/302 R |
| 2,619,421 A | 11/1952 | Greenfield | |
| 2,651,647 A | 9/1953 | Greenfield | |
| 2,658,735 A | 11/1953 | Ybarrondo | |
| 2,790,506 A | 4/1957 | Vactor | |
| 2,867,972 A | 1/1959 | Hokderreed et al. | |
| 2,879,838 A | 3/1959 | Flynt et al. | |
| 2,890,166 A | 6/1959 | Heinze | |
| 2,911,421 A | 11/1959 | Greenfield | |
| 2,911,423 A | 11/1959 | Greenfield | |
| 2,979,408 A | 4/1961 | Greenfield | |
| 2,981,250 A | 4/1961 | Steward | |
| 3,060,921 A | 10/1962 | Luring et al. | |
| 3,076,715 A | 2/1963 | Greenfield | |
| 3,211,538 A | 10/1965 | Gross et al. | |

(Continued)

FOREIGN PATENT DOCUMENTS

CL 757-2004 3/2010

(Continued)

OTHER PUBLICATIONS

Office action from Chilean Patent Application No. 238-2007, Mar. 2010.

(Continued)

*Primary Examiner* — Scott Bushey
(74) *Attorney, Agent, or Firm* — Marshall, Gerstein & Borun LLP (57) ABSTRACT

A cooling tower includes an evaporator vessel, a gas delivery tube partially disposed within the evaporator vessel to deliver a gas into the evaporator vessel and a water inlet that provides water to the evaporator vessel at a rate sufficient to maintain a controlled constant level of water within the evaporator vessel. A weir is disposed within the evaporator vessel adjacent the gas delivery tube to form a first fluid circulation path between a first weir end and a wall of the evaporator vessel and a second fluid circulation path between a second weir end and an upper end of the evaporator vessel. During operation, gas introduced through the tube mixes with the water and the combined gas and fluid flow at a high rate with a high degree of turbulence along the first and second circulation paths defined around the weir, thereby promoting vigorous mixing and intimate contact between the gas and the water. This turbulent flow develops a significant amount of interfacial surface area between the gas and the water which leads to a more efficient and complete evaporation.

33 Claims, 6 Drawing Sheets

U.S. PATENT DOCUMENTS

| | | | |
|---|---|---|---|
| 3,212,235 A | 10/1965 | Markant | |
| 3,215,189 A | 11/1965 | Bauer | |
| 3,251,398 A | 5/1966 | Greenfield | |
| 3,284,064 A | 11/1966 | Kolm et al. | |
| 3,304,991 A | 2/1967 | Greenfield | |
| 3,323,575 A | 6/1967 | Greenfield | |
| 3,405,918 A | 10/1968 | Calaceto et al. | |
| 3,432,399 A | 3/1969 | Schutt | |
| 3,539,549 A | 11/1970 | Greenfield | |
| 3,601,374 A | 8/1971 | Wheeler | |
| 3,638,924 A | 2/1972 | Calaceto et al. | |
| 3,713,786 A | 1/1973 | Umstead | |
| 3,716,458 A | 2/1973 | Greenfield | |
| 3,743,483 A | 7/1973 | Shah | |
| 3,756,580 A * | 9/1973 | Dunn | 261/123 |
| 3,762,893 A * | 10/1973 | Larsen | 48/127.1 |
| 3,782,300 A * | 1/1974 | White et al. | 110/238 |
| 3,789,902 A | 2/1974 | Shah et al. | |
| 3,838,974 A | 10/1974 | Hemsath et al. | |
| 3,840,002 A | 10/1974 | Douglas et al. | |
| 3,844,748 A | 10/1974 | Lanier | |
| 3,855,079 A | 12/1974 | Greenfield | |
| 3,870,585 A | 3/1975 | Kearns et al. | |
| 3,876,490 A | 4/1975 | Tsuruta | |
| 3,898,134 A | 8/1975 | Greenfield | |
| 3,917,508 A | 11/1975 | Greenfield | |
| 3,925,148 A | 12/1975 | Erwin | |
| 3,947,327 A | 3/1976 | Greenfield | |
| 3,950,230 A | 4/1976 | Greenfield | |
| 4,007,094 A | 2/1977 | Greenfield | |
| 4,013,516 A | 3/1977 | Greenfield | |
| 4,026,682 A | 5/1977 | Pausch | |
| 4,060,587 A | 11/1977 | Lewis | |
| 4,119,538 A | 10/1978 | Yamauchi et al. | |
| 4,230,536 A | 10/1980 | Sech | |
| 4,259,185 A | 3/1981 | Mixon | |
| 4,270,974 A | 6/1981 | Greenfield | |
| 4,276,115 A | 6/1981 | Greenfield | |
| 4,289,578 A | 9/1981 | Greenfield et al. | |
| 4,300,924 A | 11/1981 | Coyle | |
| 4,336,101 A | 6/1982 | Greenfield et al. | |
| RE31,185 E | 3/1983 | Greenfield | |
| 4,432,914 A | 2/1984 | Schifftner | |
| 4,440,098 A | 4/1984 | Adams | |
| 4,518,458 A | 5/1985 | Greenfield | |
| 4,608,120 A | 8/1986 | Greenfiled | |
| 4,648,973 A | 3/1987 | Hultholm et al. | |
| 4,683,062 A | 7/1987 | Krovak et al. | |
| 4,863,644 A * | 9/1989 | Harrington et al. | 261/77 |
| 4,913,065 A | 4/1990 | Hemsath | |
| 5,009,511 A | 4/1991 | Sarko et al. | |
| 5,030,428 A | 7/1991 | Dorr et al. | |
| 5,032,230 A | 7/1991 | Shepherd | |
| 5,076,895 A | 12/1991 | Greenfield et al. | |
| 5,132,090 A | 7/1992 | Volland | |
| 5,154,898 A | 10/1992 | Ajinkya et al. | |
| 5,190,670 A | 3/1993 | Stearns | |
| 5,238,580 A | 8/1993 | Singhvi | |
| 5,279,646 A | 1/1994 | Schwab | |
| 5,336,284 A | 8/1994 | Schifftner | |
| 5,342,482 A | 8/1994 | Duesel et al. | |
| 5,378,267 A | 1/1995 | Bros et al. | |
| 5,484,471 A | 1/1996 | Schwab | |
| 5,512,085 A | 4/1996 | Schwab | |
| 5,552,022 A | 9/1996 | Wilson | |
| 5,585,005 A | 12/1996 | Smith et al. | |
| 5,636,623 A | 6/1997 | Panz et al. | |
| 5,656,155 A | 8/1997 | Norcross et al. | |
| 5,759,233 A | 6/1998 | Schwab | |
| 5,934,207 A | 8/1999 | Echols et al. | |
| 5,968,352 A * | 10/1999 | Ditzler | 210/220 |
| 6,007,055 A | 12/1999 | Schifftner | |
| 6,149,137 A * | 11/2000 | Johnson et al. | 261/27 |
| 6,293,277 B1 * | 9/2001 | Panz et al. | 126/360.2 |
| 6,383,260 B1 | 5/2002 | Schwab | |
| 6,391,100 B1 | 5/2002 | Hogan | |
| 6,402,816 B1 | 6/2002 | Trivett et al. | |
| 6,485,548 B1 | 11/2002 | Hogan | |
| 6,547,855 B1 | 4/2003 | Schmidtke | |
| 6,616,733 B1 | 9/2003 | Pellegrin | |
| 6,719,829 B1 | 4/2004 | Schwab | |
| 6,913,671 B2 | 7/2005 | Bolton et al. | |
| 7,074,339 B1 | 7/2006 | Mims | |
| 7,111,673 B2 | 9/2006 | Hugill | |
| 7,142,298 B2 | 11/2006 | Nuspliger | |
| 7,144,555 B1 | 12/2006 | Squires et al. | |
| 7,156,985 B1 | 1/2007 | Frisch | |
| 7,332,010 B2 | 2/2008 | Steiner | |
| 7,402,247 B2 | 7/2008 | Sutton | |
| 7,416,172 B2 * | 8/2008 | Duesel et al. | 261/77 |
| 7,424,999 B2 | 9/2008 | Xu et al. | |
| 7,459,135 B2 | 12/2008 | Pieterse et al. | |
| 7,572,626 B2 | 8/2009 | Frisch et al. | |
| 7,591,309 B2 | 9/2009 | Minnich et al. | |
| 7,758,819 B2 | 7/2010 | Nagelhout | |
| 2002/0069838 A1 | 6/2002 | Rautenbach et al. | |
| 2002/0158024 A1 | 10/2002 | Van Slyke et al. | |
| 2004/0040671 A1 | 3/2004 | Duesel et al. | |
| 2004/0045681 A1 | 3/2004 | Bolton et al. | |
| 2004/0213721 A1 | 10/2004 | Arno et al. | |
| 2005/0074712 A1 | 4/2005 | Brookshire et al. | |
| 2007/0251650 A1 | 11/2007 | Duesel et al. | |
| 2008/0213137 A1 | 9/2008 | Frisch et al. | |

FOREIGN PATENT DOCUMENTS

| | | |
|---|---|---|
| DE | 556 455 | 8/1932 |
| DE | 11 73 429 | 7/1964 |
| FR | 2 441 817 | 6/1980 |
| GB | 383 570 | 11/1932 |
| GB | 463 770 | 4/1937 |
| WO | WO-2004/022487 | 3/2004 |

OTHER PUBLICATIONS

English language translation of an office action from Chilean Patent Application No. 237-2007, Mar. 2010.

A.G. Jones, *Liquid Circulation in a Draft-Tube Bubble Column*, Chemical Engineering Science, vol. 40, No. 3, pp. 449-462, 1985, Pergamon Press Ltd., Great Britain.

Hirotsugu Hattori et al., *Fluid and Solids Flow Affecting the Solids Circulation Rate in Spouted Beds with a Draft Tube*, Journal of Chemical Engineering of Japan, vol. 37, No. 9, pp. 1085-1091, 2004, Shinshu University, Japan.

M. Yoshino et al., *Removal and Recovery of Phosphate and Ammonium as Struvite from Supernatant in Anaerobic Digestion*, Water Science and Technology, vol. 48, No. 1, pp. 171-178, 2003, IWA Publishing, Japan.

D. Fox et al., *Control Mechanisms of Fluidized Solids Circulation Between Adjacent Vessels*, AIChE Journal, Dec. 1989, vol. 35, No. 12, pp. 1933-1941, Universite de Technologie de Compiegne, France.

Liang-Shih Fan et al., *Some Remarks On Hydrodynamic Behavior Of A Draft Tube Gas-Liquid-Solid Fluidized Bed*, Department of Chemical Engineering, The Ohio State University, Columbus, Ohio 43210, 2007.

N.D. Barrett et al., *The Industrial Potential And Economic Viability Of Spouted Bed Processes*, Chemeca 85, paper D4c, pp. 401-405, The Thirteenth Australasian Conference On Chemical Engineering, Perth, Australia, Aug. 1985.

J.K. Claflin, *Intraparticle Conduction Effects On The Temperature Profiles In Spouted Beds*, Chemeca 85, paper D9b, pp. 471-475, The Thirteenth Australasian Conference On Chemical Engineering, Perth, Australia, Aug. 1985.

Dawn Smith, *Sludge-U-Like, As The Ban On Sea Disposal Of Sewage Waste Looms, Technologies That Can Deliver Cleaner, Thicker And More Farmer-Friendly Sludges Are Gaining Popularity*, Water Bulletin 708, Jun. 21, 1996.

Harry Brandt, et al., *Treatment Process For Waste Water Disposal Of The "Morcinek" Mine Using Coalbed Methane*, Conference On Coalbed Methane Utilization, Oct. 5-7, 1994, Katowice, Poland.

Yutaka Miyake et al., *Performance Characteristics of High Speed-Type Cross Flow Turbine*, 1993.

Ho-Ming Yeh et al., *Double-Pass Heat Or Mass Transfer Through A Parallel-Plate Channel with Recycle*, International Journal of Hat and Mass Transfer 43 pp. 487-491, 2000, Department of Chemical Engineering, Tamkang University, Tamisui, Taipei 251, Taiwan.
Sathyanarayana et al., *Circular C.W. Intake System—A Research Opinion*, Seventh Technical Conference of the British Pump Manufacturer's Association, paper 21, pp. 293-313, 1981.
Caridad Talbert et al., *The Elecrospouted Bed*, IEEE Transactions on Industry Applications, vol. 1A-20, No. 5, Sep./Oct. 1984, pp. 1220-1223.
Wayne J. Genck, *Guidelines For Crystallizer Selection And Operation*, CEP, Oct. 2004, pp. 26-32. www.cepmagazine.org.
M. K. Bennett et al., *Design Of A Software Application For The Simulation And Control Of Continuous And Batch Crystallizer Circuits*, Advances in Engineering Software 33, 2002, pp. 365-374, Department of Chemical and Biochemical Engineering, Faculty of Engineering Science, University of Western Ontario, London, Ont. Canada N6A 5B9.
G. A. St. Onge et al., *Start-Up, Testing, And Performance Of The First Bulb-Type Hydroelectric Project In The U.S.A.*, IEEE Transactions on Power Apparatus Systems, vol. PAS-101, No. 6, Jun. 1982, pp. 1313-1321.
Nely T. Padial et al., *Three-Dimensional Simulation Of A Three-Phase Draft-Tube Bubble Column*, Chemical Engineering Science 55 (2000), pp. 3261-3273.
J. K. Claflin et al., *The Use Of Spouted Beds For The Heat Treatment Of Grains*, Chemeca 81, The 9$^{th}$ Australasian Conference on Chemical Engineering, Christchurch, New Zealand, Aug. 30 to Sep. 4, 1981, pp. 65-72.
R. Swaminathan et al., *Some Aerodynamic Aspects Of Spouted Beds Of Grains*, Department of Chemical Engineering, McGill University, Montreal, Quebec, Canada, pp. 197-204, 2007.
W.A. Cross et al., *Leachate Evaporation By Using Landfill Gas*, Proceedings Sardinia 97, Sixth Landfill Symposium, S. Margherita di Pula, Cagliari, Italy, Oct. 13-17, 1997, pp. 413-422.
Z. H. Ye et al., *Removal And Distribution Of Iron, Manganese, Cobalt, And Nickel Within A Pennsylvania Constructed Wetland Treating Coal Combustion By-Product Leachate*, J. Environ. Qual. 30:1464-1473, 2001.
R. Williams et al., *Aspects Of Submerged Combustion As A Heat Exchange Method*, Trans IChemE, vol. 71, Part A, May 1993, pp. 308-309.
J. C. Mueller et al., *Rotating Disk Looks Promising For Plant Wastes*, 2007.
Kenneth Dunn, *Incineration's Role In Ultimate Disposal Of Process Wastes*, Chemical Engineering, Deskbook Issue, Oct. 6, 1975, pp. 141-150.
Harry Berg, *The Development Of The Controlled Buoyancy System For Installation Of Submerged Pipelines*, Journal AWWA, Water Technology/Quality, Mar. 1977, pp. 214-218.
Yasutoshi Shimizu et al., *Filtration Characteristics Of Hollow Fiber Microfiltration Membranes Used In Membrane Bioreactor For Domestic Wastewater Treatment*, Wat. res. vol. 30, No. 10, pp. 2385-2392, 1996.
Philip Bachand et al., *Denitrification In Constructed Free-Water Surface Wetlands: II. Effects Of Vegetation And Temperature*, Ecological Engineering 14, pp. 17-32, 2000.
M. Etzensperger et al., *Phenol Degradation In A Three-Phase Biofilm Fluidized Sand Bed Reactor*, Bioprocess Engineering 4, pp. 175-181, 1989.
G. I. Cherednichenko et al., *Disposal Of Saline Wastes From Petroleum Refineries*, All-Union Scientific-Research and Planning-Design Institute of the Petroleum Refining and Petrochemical Industry, Translated from Khimiya I Tekhnologiya Topliv I Masel, No. 9, pp. 37-39, Sep. 1974.
E. L. Durkee et al., *Field Tests Of Salt Recovery System For Spent Pickle Brine*, 2007.
Marko Hocevar et al., *The Influence Of Draft-Tube Pressure Pulsations On The Cavitation-Vortex Dynamics In A Francis Turbine*, Journal of Mechanical Engineering 49, 2003, pp. 484-498.
German Kurz, *Tauchbrenner*, OI U. Gasfeuerung, 18 (3), 1973, pp. 171-180.
Schoene, O, "Die Entolung des Abdampfes and der Kondensate von Kolbendampfmaschinen," Braunkohle, 31:82-92 (1932).
Alabovskij et al., *Evaporation Des Eaux De Lavage De Chaudieres Dans Des Appareils A Combustion Immergee*, Promyshl. Energet, 1975 (4), pp. 38-39.
International Search Report issued in PCT/US2006/028515 mailed on Nov. 14, 2006.
International Preliminary Report on Patentability for Application No. PCT/US2007/001487, dated Jul. 21, 2009.
International Preliminary Report on Patentability for Application No. PCT/US2007/001632, dated Jul. 21, 2009.
International Preliminary Report on Patentability for Application No. PCT/US2007/001633, dated Jul. 21, 2009.
International Preliminary Report on Patentability for Application No. PCT/US2007/001634, dated Jul. 21, 2009.
English Translation of Hage, H., "The MeMon Experiment: A Step towards Large-Scale Processing of Manure," Applied Science, 4 (1988).
LFG Specialties, LLC. 2006 Product Catalog.
Screen shots from video on LFG website taken Jan. 18, 2011 (http://www.shawgrp.com/markets/envservices/envsolidwaste/swlfg).
Office Action for U.S. Appl. No. 11/625,002, dated Jan. 6, 2010.
Final Office Action for U.S. Appl. No. 11/625,002, dated May 26, 2010.
Notice of Allowance for U.S. Appl. No. 11/625,159, dated Jul. 9, 2010.
Office Action for U.S. Appl. No. 11/625,024, dated Nov. 27, 2009.
Office Action for U.S. Appl. No. 11/625,024, dated Jun. 18, 2010.
Final Office Action for U.S. Appl. No. 11/625,024, dated Dec. 8, 2010.

* cited by examiner

COOLING TOWER

FIELD OF THE DISCLOSURE

The present disclosure relates generally to cooling towers, and more specifically, to evaporative or wet cooling towers.

BACKGROUND

Cooling towers of the evaporative type are used to cool water to levels that approach ambient air temperatures. Because the water discharged from cooling towers may be recycled back to the cooling tower from processes that apply the water for cooling purpose, cooling towers are most generally used for the purpose of conserving water resources. Common applications for the cooling water produced in cooling towers include removing heat from critical components or controlling the operating temperature of engines, electrical generators, refrigeration compressors (e.g., air conditioning) and a broad range of industrial processes across a broad spectrum of industries. Natural draft and mechanical draft cooling towers are the two types of cooling towers that are most commonly used in commercial service.

As evaporative coolers, natural draft and mechanical draft cooling towers rely on the transfer of both sensible at latent heat between water and air to cool water by rejecting heat to air. Sensible heat is transferred primarily by conduction as heat flows from the warmer water to the cooler air, and latent heat is transferred through evaporation of a portion of the water into the air. The evaporative effect provides the preponderance of heat transfer in evaporative cooling processes, typically about 80%. Theoretically, heat exchange between the water and air within the cooling tower could continue until the air becomes saturated with moisture (i.e., reaches 100% relative humidity) at the adiabatic saturation temperature of the cooling system. Thus, the lowest theoretical temperature that the water can be cooled to is limited by the inlet temperatures of the air and water and the moisture content (humidity) of the inlet air. In practice, the outlet water temperature from a cooling tower may generally be brought to within approximately 5 degrees Fahrenheit of the wet bulb temperature of the incoming air stream.

Because cooling towers rely on heat and mass transfer between water and air and both conductive heat transfer and evaporation proceed fastest when the two phases are in direct contact, the efficiency of a coo ting tower is critically dependent on bringing the air and water into intimate contact over a large area of interfacial surface between the two phases. Likewise, given that intimate contact over a finite interfacial surface area exists, increasing the degree of mixing or turbulence within the water and air phases increases both the rate of conductive heat transfer and evaporation (mass transfer). However, the particular method used to create interfacial surface area and the means by which the air is forced to flow over the surface area affect the size of the cooling tower and compact designs are generally more desirable considering: the value of space within industrial facilities; the fact that many cooling lowers are installed on rooftops; and the negative aesthetic impact of larger units.

Natural draft cooling towers are used almost exclusively to cool large power generating plants due in part to the tremendous size of such towers and the high circulating rates of the cooling water required to justify the costs of building the towers, usually in range of 100,000 to 200,000 gal/min. Natural draft cooling towers use very large concrete chimneys to introduce air into the system and may be 400 feet or more in height for large applications such as providing cooling water for nuclear power plants. Packing or fill located within the chimney of a natural draft cooling tower is typically used to create a large amount of extended surface area for contacting the water and air phases within the chimney. A water distribution system, usually spray nozzles or a weir system, is normally used to uniformly distribute the incoming warm water over the top of the packing or fill. Thus distributed, the water flows downward over the extended surface area within the chimney of the natural draft cooling tower as a thin film under the force of gravity. Air within the chimney that is contact with the surface of the warm water picks up both heat and moisture from the water causing the density (i.e., weight per unit volume) of the air to decrease. This decrease in density creates a buoyancy effect that causes the air to rise upward through and out of the top of the chimney while higher density ambient air is drawn into openings located at the bottom of the chimney. This flow (natural draft) through the chimney of the natural draft cooling tower continues for as long at the driving forces of differential temperature between warm water and cooler air and the ability of the air to absorb moisture persist within the chimney.

Mechanical draft cooling towers, on the other hand, generally use fans to force air over circulated water as the water flows downward under the force of gravity over the same types of packing or fill as used in natural draft cooling towers. Mechanical draft cooling towers are scalable and generally range in height from approximately 10 feet to more than 40 feet, and from a few gallons of cooling fluid per minute to hundreds or thousands of gallons of cooling fluid per minute depending on the particular cooling requirements. Because mechanical draft cooling lowers rely on fans to force air to flow over the film of water distributed over the extended surface area of the packing or fill, the rates of heat and mass transfer per unit of surface area can be increased based on the ability of the fans to directly induce greater turbulence to the air stream and thereby indirectly induce greater turbulence to the water through disturbance of the surface of the water film by the air flowing over it. Thus, at the cost of using higher pressure or higher volume fans, mechanical draft cooling towers can achieve higher efficiency per unit of interfacial contact area than that of natural draft cooling towers. Due to improved efficiency, mechanical draft cooling towers are generally more compact than natural draft cooling towers per unit of cooling, but more expensive to purchase, operate and maintain per unit of cooling.

Of course, typical cooling towers have inefficiencies. Some entrained droplets of water escape with the air as it rises through the cooling tower. This phenomenon is known as drift or windage. To mitigate this problem, known systems employ drift eliminators, typically in the form of a series of baffle-like devices to collect the entrained droplets and return them to the water phase. Additionally, the evaporation of water causes dissolved solids within the cooling fluid to become more concentrated. Eventually, without corrective action, the solids will begin to precipitate out of the cooling fluid and join with additional particles of solids that are brought into the cooling tower with the air causing fouling of the system.

Each of these problems requires mitigation in the form of periodic cleaning and replacement of the concentrated water with fresh water in order to maintain dissolved solids at acceptable levels. Normally, in order to maintain the level of concentration within the cooling tower at acceptable levels, a portion of the cooling water is continuously withdrawn as waste (blow down) and an equal portion of fresh water is continuously added to the cooling tower.

Submerged gas evaporators, also known as submerged gas reactors and/or combination submerged gas evaporator/reactor systems in which gas is dispersed within the liquid phase are used to concentrate wastewater streams by evaporation prior to disposing of any unwanted compounds within the wastewater. Such submerged gas evaporators may be useful as cooling towers as well. U.S. Pat. No. 5,342,482, which is hereby incorporated by reference, discloses a common type of submerged combustion gas evaporator, in which gas is delivered though an inlet pipe to a dispersal unit submerged within the liquid to be evaporated. The dispersal unit includes a number of spaced-apart gas delivery pipes extending radially outward from the inlet pipe, each, of the gas delivery pipes having small holes spaced apart at various locations on the surface of the gas delivery pipe to disperse the combustion gas as small bubbles as uniformly as practical across the cross-sectional area of the liquid held within the processing vessel. According to current understanding within the prior art, this design provides desirable intimate contact between the liquid and the combustion gas over a large interfacial surface area while also promoting thorough agitation of the liquid within the evaporation vessel.

Because submerged gas evaporators disperse gas into a continuous liquid phase, for a given ratio of gas to liquid at a particular pressure the volume of the required space within the equipment that is used to bring the two phases into contact is the minimum possible and generally a much smaller volume than that required in gas-liquid contacting devices used in conventional cooling towers where the gas is the continuous phase and the liquid is dispersed into the gas stream either as droplets or thin moving films flowing over the extended surfaces of packing or fill.

However, during the evaporation process dissolved solids within the liquid phase become more concentrated often leading to the formation of precipitates that are difficult to handle. In certain cases precipitation of solids can lead to the formation of large crystals or agglomerates that can block passages within processing equipment, such as the gas exit holes in the system described in U.S. Pat. No. 5,342,482. Generally speaking, liquid streams that cause deposits to form on surfaces and create blockages within process equipment are called fouling fluids Unlike conventional cooling towers where heat and mass are transferred from the liquid phase as it flows over the extended surface of fill or packing, heat and mass transfer within submerged gas evaporators takes place at the dynamic renewable interfacial surface area of a discontinuous gas phase dispersed within a continuous liquid phase and there are no solid surfaces upon which deposits can accumulate.

Submerged gas evaporators also tend to mitigate the formation of large crystals because dispersing the gas beneath the liquid surface promotes vigorous agitation within the evaporation zone, which is a less desirable environment for crystal growth than a more quiescent zone. Further, active mixing within the evaporation vessel tends to maintain precipitated solids in suspension and thereby mitigates the formation of potential blockages that are related to settling and/or agglomeration of suspended solids.

However, mitigation of crystal growth and settlement is dependent on the degree of mixing achieved within a particular submerged gas evaporator, and not all submerged gas evaporator designs provide adequate mixing to prevent large crystal growth and related blockages. Therefore, while the dynamic renewable heat transfer surface area feature of submerged gas evaporators eliminates the potential for fouling fluids and/or precipitates to coat extended surfaces, conventional submerged gas evaporators are still subject to potential blockages and carryover of entrained liquid within the exhaust gas flowing away from the evaporation zone.

Regardless of the type of submerged gas evaporator, in order for the process to continuously perform effectively, reliably and efficiently, the design of the submerged gas evaporator must include provisions for efficient heat and mass transfer between gas and liquid phases, control of entrained liquid droplets within the exhaust gas, mitigating the formation of large crystals or agglomerates of particles and maintaining the mixture of solids and liquids within the submerged gas evaporation vessel in a homogeneous state to prevent settling and agglomeration of suspended particles.

SUMMARY OF THE DISCLOSURE

A cooling tower includes an evaporator vessel and one or more tubes partially disposed within the evaporator vessel, which are adapted to transport a gas (e.g., air) into the interior of the evaporator vessel. The evaporator vessel has an inlet that transports warm water to be cooled into the vessel at a rate that maintains the water level inside the evaporator vessel at a predetermined level. The evaporator vessel may include an open top or an exhaust stack to allow gas to flow away from the vessel. In addition, the cooling tower includes one or more weirs that at least partially surround the tube or tubes and are submerged in the water to create a fluid circulation path formed by the space between each weir or each weir and the interior wall surface of the evaporation vessel and each tube. In one embodiment, each weir is open at both ends and forms a lower circulation gap between a first one of the weir ends and a bottom wall of the evaporator vessel and an upper circulation gap between a second one of the weir ends and the normal operating level of the surface of the water within the evaporation vessel During operation, gas introduced through each tube mixes with the water in a first confined volume formed by a weir, or a weir and the interior wall surface of the evaporation vessel and the tube, and the mixture of gas and water flows at high volume with a high degree of turbulence along the circulation path defined around the weir, thereby imposing a high degree of mixing action between the gas and the water and any suspended particles within the water. Shear forces within this two-phase or three-phase turbulent flow region that result from the high density water phase overrunning the low density gas phase create extensive interfacial surface area between the gas and the water that favors minimum residence time for mass and heat transfer between the liquid and gas phases to come to equilibrium compared to conventional gas dispersion techniques. Still further, vigorous mixing created by the turbulent flow hinders the formation of large crystals of precipitates within the water and, because the system does not use small openings to introduce the gas into the water, clogging and fouling are significantly reduced or entirely eliminated. Still further, the predominantly horizontal flow direction of the water and gas mixture over the top of the weir and along the surface of the water within the evaporator vessel enables the gas phase to disengage from the water with minimal entrainment of water droplets due to the significantly greater momentum of the much higher density water that is directed primarily horizontally compared to the low density gas with a relatively weak but constant vertical momentum component due to buoyancy. The cooled water may be pumped through an outlet port to any number of heat exchange systems for the purpose of cooling equipment, the heated water may then be returned to the cooling tower for additional cooling.

In addition, a method of cooling water using a submerged gas evaporator includes providing the warm water to be cooled to a vessel at a rate sufficient to maintain the surface of the water at a predetermined level within the vessel, supplying a gas to the vessel, and mixing the gas and cooling fluid within the vessel by causing the gas and water to flow around a weir or multiple weirs, within the cooling tower to thereby transfer heat and mass between the gas and water.

The advantages of cooling towers according to the disclosure may be realized by substituting such cooling towers for conventional cooling towers in most cooling applications. Wherever cooling towers according to the disclosure are employed, conventional means may be used to control the gas flow and the flow of the cooling liquid through the cooling towers. Likewise, most other conventional means of controlling cooling tower systems to meet the requirements of a particular application may be employed. Further, multiple cooling towers according to the invention may be connected in series or parallel configurations to meet the cooling demand and cooling fluid volume for a particular application.

DETAILED DESCRIPTION

Advantages of cooling towers according to the disclosure may be realized by substituting such cooling towers for conventional cooling towers in most cooling applications. Wherever cooling towers according to the disclosure are employed, conventional means may be employed to control the flow of the gas and the flow of cooling fluid through the cooling tower and, if required, to post-treat the cooling liquid and/or gas. Likewise, most other conventional means of controlling cooling tower systems to meet the requirements of a particular application may be employed. Also, multiple cooling towers according to the disclosure may be connected in series or parallel configurations to meet the cooling demand of a particular application.

Figure 1:
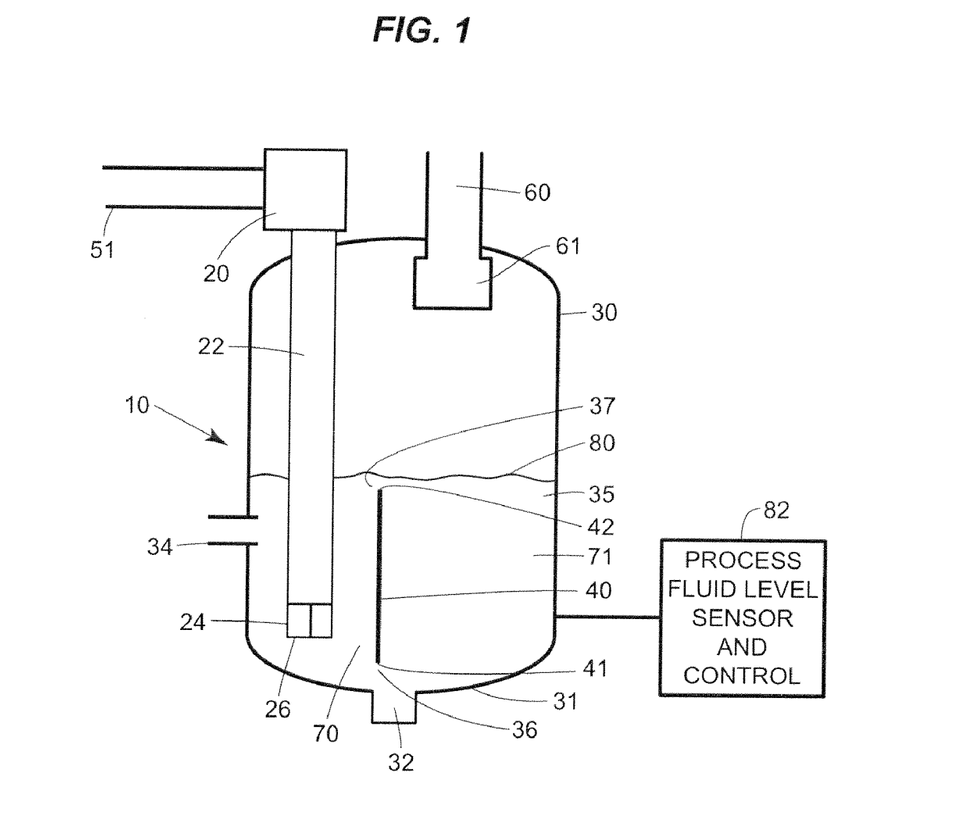
FIG. 1 is a cross-sectional view of a cooling tower constructed in accordance with the teachings of the disclosure.

Referring to FIG. 1, a cooling tower 10, in the form of a submerged combustion gas evaporator, includes a blower 20 that provides gas under positive pressure to an evaporator vessel 30 through a gas supply Lube or gas inlet tube 22 having sparge or air exit ports 24 at or near an end 26 thereof. The evaporator vessel 30 has a bottom wall 31 and a cooled water outlet port 32. An inlet port 34 for warm water 35 to be cooled is disposed in one side of the evaporator vessel 30 and enables a mixture of the warm water 35, makeup water (not shown) and any chemical additives (not shown), which may be used to control corrosion and/or biological growth, to be provided into the interior of the evaporator vessel 30. Additionally, a weir 40, which is illustrated in FIG. 1 as a flat or solid plate member having a first or lower end 41 and a second or upper end 42, is disposed within the evaporator vessel 30 adjacent the gas inlet tube 22. Although the evaporator vessel 30 and gas supply tube 22 are generally shown herein as cylindrical in shape, one skilled in the art will realize that many other shapes may be employed for these elements. The weir 40 defines and separates two volumes 70 and 71 within the evaporator vessel 30. As illustrated in FIG. 1, a gas exit port 60, disposed in the top of the evaporator vessel 30, enables gas to exit from the interior of the evaporator vessel 30. Disposed at or near a junction of the gas exit port 60 and the evaporator vessel 30 is a demister 61. The demister 61 removes droplets of water that are entrained in the gas phase as the gas disengages from the liquid phase at the surface 80 of the water. The demister 61 may be a vane-type demister, a mesh pad-type demister, or any combination of commercially available demisters elements. Further, a vane-type demister may be provided having a coalescing filter to improve demisting performance. The demister 61 may be mounted in any orientation and adapted to a particular evaporator vessel 30 including, but not limited to, horizontal and vertical orientations.

In the cooling tower of FIG. 1, the blower 20 supplies gas through a line 51 to the evaporator vessel 30. Moreover, the water is supplied through the fluid inlet 34 by a pump (not shown in FIG. 1) at a rate sufficient to maintain the surface 80 of the water 35 within the evaporator vessel 30 at a predetermined level, which may be set by a user. A level sensor and control 82 may be used to determine and control the rate that the water 35 is supplied through the inlet port 34.

As illustrated in FIG. 1, the weir 40 is mounted within the evaporator vessel 30 to form a lower circulation gap 36 between the first end 41 of the weir 40 and the bottom wall 31 of the evaporator vessel 30 and to form an upper circulation gap 37 between the second end 42 of the weir 40 and the surface 80 of the water 35 (or the top wall of the evaporator vessel 30). As will be understood, the upper end 42 of the weir 40 is preferably set to be at or below the surface level 80 of the water 35 when the water 35 is at rest (i.e., when no gas is being introduced into the vessel via the gas inlet tube 22). In some situations, it may be possible to set the upper end 42 of the weir 40 above the at rest level of the water 80, as long as introduction of the gas via the gas inlet tube 22 still causes liquid to flow over the upper end 42 of the weir 40. In any event, as illustrated in FIG. 1, the weir 40 also defines and separates the confined volume or space 70 in which the sparge ports 24 are located from the volume or space 71. If desired, the weir 40 may be mounted to the evaporator vessel 30 via welding, bolts or other fasteners attached to internal side walls of the evaporator vessel 30.

During operation, a pressurized mixture of gas from the line 51 is forced to flow under pressure into and through the gas inlet tube 22 before reaching the sparge or exit ports 24. The gas exits the gas inlet tube 22 through the sparge ports 24 into the confined volume 70 enclosed by the weir 40, the gas inlet tube 22 and the side wall of the evaporation vessel 30, causing the gas to be dispersed into the continuous liquid phase of the water within the evaporator vessel 30. Generally speaking, gas exiting from the sparge ports 24 mixes with the liquid phase of the water within the confined volume 70 and causes a high volume flow pattern to develop around the weir 40. The velocity of the flow pattern and hence the turbulence associated with the flow pattern is highest within the confined volume 70 and at the locations where the liquid flows through the upper gap 37 and the lower gap 36 of the weir 40. The turbulence within the confined volumes 70 and 71 significantly enhances the dispersion of the gas into the water which, in turn, provides for efficient heat and mass transfer between the gas and the water. In particular, after exiting the sparge ports 24, the gas is dispersed as a discontinuous phase into a continuous liquid phase of the water forming a gas/liquid mixture within the confined volume 70. The mass per unit volume of the gas/liquid mixture at any point within the confined volume 70 is significantly less than the average mass per unit volume of the mixture of gas and the continuous liquid phase of the water in the volume 71 due to the large difference in mass per unit volume of the liquid compared to the gas, typically on the order of approximately 1000 to 1. This difference in mass per unit volume creates a difference in static hydraulic pressure between the gas/liquid mixture in the confined volume 70 and the liquid phase in the volume 71 at all elevations within the vertical extent of the weir. This imbalance in static hydraulic pressure forces the water to flow from the higher pressure region, i.e., the volume 71, to the lower pressure region, i.e., the confined volume 70, at a rate that overcomes the impressed static hydraulic pressure imbalance and creates flow upward through the confined volume 70.

Put another way, the dispersion of gas into the water 35 within the confined volume 70 at the sparge ports 24 develops a continuous flow pattern that draws water 35 under the bottom edge 41 of the weir 40 through the lower circulation gap 36, and causes the mixture of gas and water 35 to move through the confined volume 70 and toward the surface 80 of the water 35. Near the surface 80, the gas/liquid mixture reaches a point at which the imbalance of static hydraulic pressure is eliminated. Generally speaking, this point is at or near the upper circulation gap 37 formed between the second end 42 of the weir 40 and the surface 80. At the balance point, the force of gravity, which becomes the primary outside force acting on the gas/fluid mixture, gradually reduces the vertical momentum of the gas/liquid mixture to near zero. This reduced vertical momentum, in turn, causes the gas/liquid mixture to flow in a predominantly horizontal direction over the second end 42 of the weir 40 (through the circulation gap 37 defined at or near the surface 80 of the water 35) and into the liquid phase of the water 35 within the volume 71.

This flow pattern around and over the weir 40 affects the dispersion of the gas into the continuous liquid phase of the water 35 and, in particular, thoroughly agitates the continuous liquid phase of the water 35 within the evaporator vessel 30 while creating a substantially horizontal How pattern of the gas/liquid mixture at and near the surface 80 of the continuous liquid phase of the water 35. This horizontal flow pattern significantly mitigates the potential for entrained liquid droplets to be earned vertically upward along with the dispersed gas phase as the dispersed gas phase rises through the liquid phase due to buoyancy and finally disengages from the continuous liquid phase of the water at the surface 80 of the water 35.

Also, the mixing action created by the induced flow of liquid and liquid/gas mixtures within both the confined volume 70 and the volume 71 hinders the formation of large crystals of precipitates, which generally requires a quiescent environment. By selectively favoring the production of small incipient particles of precipitates, the mixing action within evaporator vessel 30 helps to ensure that suspended particles formed in the evaporation process may be maintained in suspension within the liquid phase circulating around the weir 40, which effectively mitigates the formation of blockages and fouling within the cooling tower. Likewise, because relatively small particles that are readily maintained in suspension are formed through precipitation, the efficiency of the evaporator is improved over conventional evaporation systems in terms of freedom from clogging and fouling and the degree to which the cooling liquid may be concentrated.

In addition, as the circulating liquid phase within volume 71 approaches the bottom wall 31 of the evaporator vessel 30, the liquid phase is forced to flow in a predominantly horizontal direction and through the lower gap 36 into the confined volume 70. This predominantly horizontal flow pattern near the bottom wall 31 of the evaporator vessel 30 creates a scouring action at and above the interior surface of the bottom wall 31 which maintains particles of solids including precipitates in suspension within the circulating liquid while the cooling tower is operating. The scouring action at and near the bottom wall 31 of the evaporator vessel 30 also provides means to re-suspend settled particles of solids whenever the cooling tower is re-started after having been shutdown for a period of time sufficient to allow suspended particles to settle on or near the bottom wall 31.

As is known, cooling towers employ a process that affects evaporation by contacting a gas with a liquid or liquid mixture, which may be a compound, a solution or slurry. Within an evaporation process that uses a submerged gas evaporator, heat and mass transfer operations occur simultaneously at the interface formed by the dynamic boundaries of the discontinuous gas and continuous liquid phases. Thus, all submerged gas evaporators include some method to disperse gas within a continuous liquid phase. The system shown in FIG. 1 however integrates the functions of dispersing the gas into the liquid phase, providing thorough agitation of the liquid phase, and mitigating entrainment of liquid droplets with the gas phase as the gas disengages from the liquid. Additionally, the turbulence and mixing that occurs within the evaporator vessel 30 due to the How pattern, created by dispersion of gas into liquid within the confined volume 70 reduces the formation of large crystals of precipitates and/or large agglomerates of smaller particles within the evaporator vessel 30.

Figure 2:
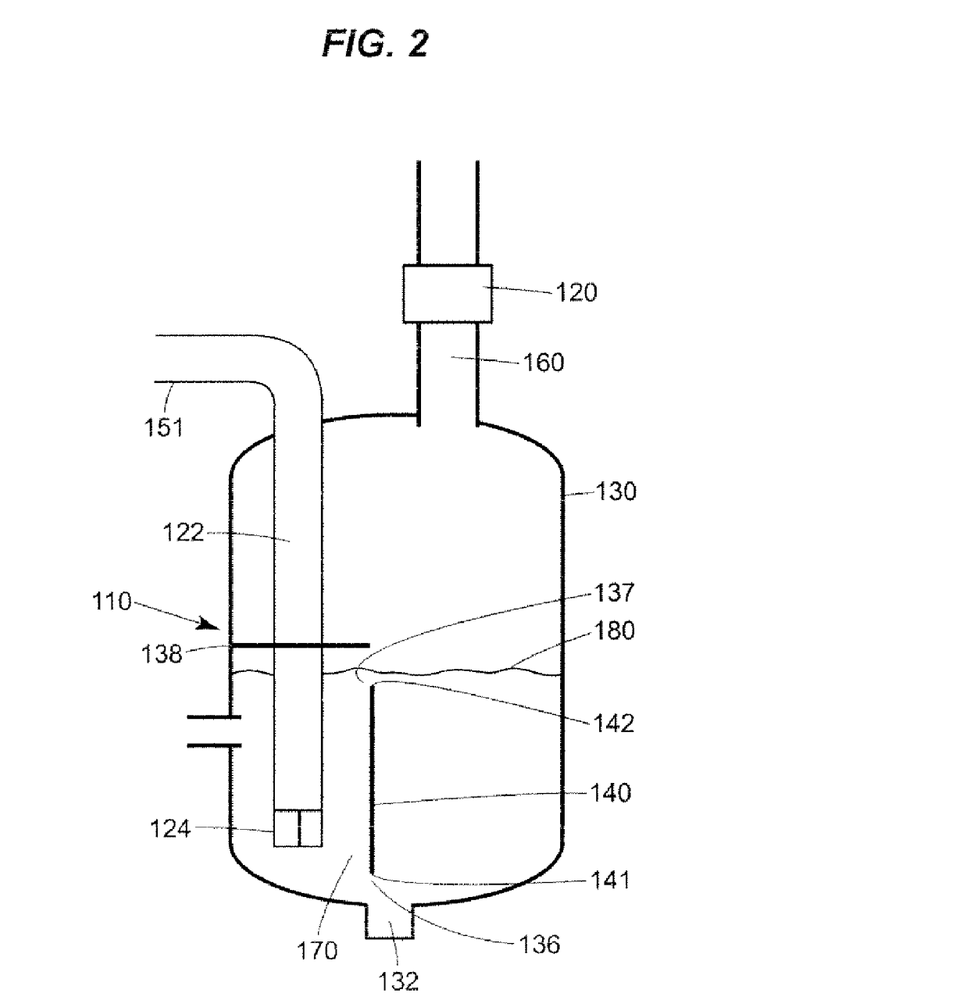
FIG. 2 is a cross-sectional view of a second cooling tower including a baffle.

FIG. 2 illustrates a second embodiment of a cooling tower 110, which is very similar to the cooling tower 10 of FIG. 1 and in which elements shown in FIG. 2 are assigned reference numbers being exactly 100 greater than the corresponding elements of FIG. 1. Unlike the device of FIG. 1, the cooling tower 110 includes a baffle or a shield 138 disposed within the evaporator vessel 130 at a location slightly above or slightly below the water surface 180 and above the second end 142 of the weir 140. The baffle or shield 138 may be a flat plate shaped and sized to conform generally to the horizontal cross-sectional area of the confined volume 170. Additionally, if desired, the baffle 138 may be mounted to any of the gas inlet tube 122, the evaporator vessel 130 or the weir 140. The baffle 138 augments the force of gravity near the balance point by presenting a physical barrier that abruptly and positively eliminates the vertical components of velocity and hence, momentum, of the gas/liquid mixture, thereby assisting the mixture to flow horizontally outward and over the weir 140 at the upper circulation gap 137. The baffle enhances the mitigation of entrained liquid droplets with the gas phase as the gas disengages from the liquid. Furthermore, the blower 120 is disposed on the gas exit port 60 in this embodiment, thus providing gas to the evaporator vessel 130 under negative pressure i.e., via suction.

As will be understood, the weirs 40 and 140 of FIGS. 1 and 2 may be generally flat plates or may be curved plates that surround the gas tubes 22 and 122 or extend across the interior of the evaporator vessel 30 between different, such as opposite, sides of the evaporator vessel 30. Basically, the weirs 40 and 140 create a wall within the evaporator vessels 30 and 130 defining and separating the volumes 70 and 71 (and 170 and 171). While the weirs 40 and 140 are preferably solid in nature they may, in some cases, be perforated, for instance, with slots or holes to modify the How pattern within the evaporator vessel 30 or 130, or to attain a particular desired mixing result within the volume 71 or 171 while still providing a substantial barrier between the volumes 70 and 71 or 170 and 171. Additionally, while the weirs 40 and 140 may extend across the evaporator vessels 30, 130 between, opposite walls of the evaporator vessels 30, 130, they may be formed into any desired shape so long as a substantial vertical barrier is formed to isolate one volume 70 (or 170) closest to a gas inlet tube 22 from the volume 71 (or 171) on the opposite side of the weir 40, 140.

Figure 3:
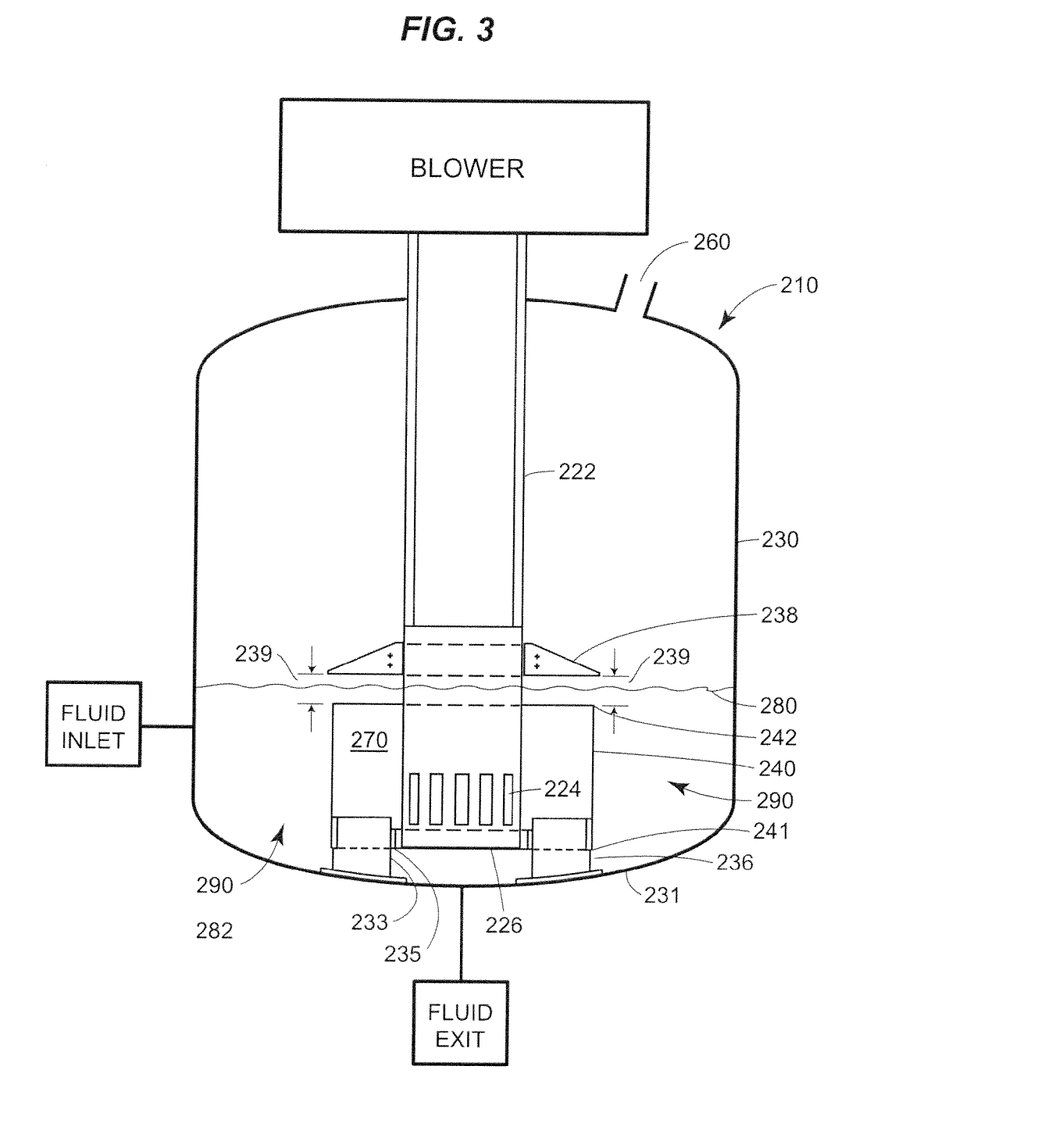
FIG. 3 is a cross-sectional view of a third cooling tower having a tubular shaped weir.

FIG. 3 illustrates a cross-sectional view of a further cooling tower 210 having a weir 240 that extends around a gas inlet tube 222. A blower device (not shown in FIG. 3) delivers approximately 3,500 standard cubic feet per minute (scfm) of gas to the gas inlet tube 222. While the dimensions of the cooling tower 210 are exemplary only, the ratios between these dimensions may serve as a guide for those skilled in the art to achieve a desirable balance between three desirable process results including: 1) preventing the formation of large crystals of precipitates and/or agglomerates of solid particles while maintaining solid particles as a homogeneous suspension within the cooling liquid by controlling the degree of overall mixing within evaporator vessel 230; 2) enhancing the rates of heat and mass transfer by controlling the turbulence and hence interfacial surface area created between the gas and liquid phases within confined volume 270; and 3) mitigating the potential of entraining liquid droplets in the gas as the gas stream disengages from the liquid phase at the liquid surface 280 by maintaining a desirable and predominately horizontal velocity component for the gas/liquid mixture flowing outward over the second end 242 of the weir 240 and along the surface of the liquid 280 within the evaporator vessel 230.

As illustrated in FIG. 3, the cooling tower 210 includes an evaporator vessel 230 with a dished bottom having an interior volume and a vertical gas inlet tube 222 at least partially disposed within the interior volume of the evaporator vessel 230. In this case, the gas inlet tube 222 has a diameter of approximately 20 inches and the overall diameter of the evaporator vessel 230 is approximately 120 inches, but these diameters may be more or less based on the design capacity and desired result as relates to both gas and liquid flow rates and the type of blower device (not shown in FIG. 3) supplying gas to the cooling tower. In this example the weir 240 has a diameter of approximately 40 inches with vertical walls approximately 26 inches in length. Thus, the weir 240 forms an annular confined volume 270 within the evaporator vessel 230 between the inner wall of the weir 240 and the outer wall of the gas inlet tube 222 with cross sectional area of approximately 6.54 square feel and volume of approximately 14.18 cubic feet. In the embodiment of FIG. 3, twelve sparge ports 224 are disposed near the bottom of the gas inlet tube 222. The sparge ports 224 are substantially rectangular in shape and are, in this example, each approximately 3 inches wide by 7¼ inches high or approximately 0.151 ft$^2$ in area for a combined total area of approximately 1.81 ft$^2$ for all twelve sparge ports 224.

As will be understood, the gas exits the gas inlet tube 222 through the sparge ports 224 into a confined volume 270 formed between the gas inlet lube 222 and a tubular shaped weir 240. In this case, the weir 240 has a circular cross-sectional shape and encircles the lower end of the gas inlet tube 222. Additionally, the weir 240 is located at an elevation which creates a lower circulation gap 236 of approximately 4 inches between a first end 241 of the weir 240 and a bottom dished surface 231 of the evaporator vessel 230. The second end 242 of the weir 240 is located at an elevation below a normal or at rest operating level of the water within the evaporator vessel 230. Further, a baffle or shield 238 is disposed within the vessel 230 approximately 8 inches above the second end 242 of the weir 240. The baffle 238 is circular in shape and extends radially outwardly from the gas inlet tube 222. Additionally, the baffle 238 is illustrated as having an outer diameter somewhat greater than the outer diameter of the weir 240 which, in this case, is approximately 46 inches. However, the baffle 238 may have the same, a greater or smaller diameter than the diameter of the weir 240 if desired. Several support brackets 233 are mounted to the bottom surface 231 of the evaporator vessel 230 and are attached to the weir 240 near the first end 241 of the weir 240. Additionally, a gas inlet tube stabilizer ring 235 is attached to the support brackets 233 and substantially surrounds the bottom end 226 of the gas inlet tube 222 to stabilize the gas inlet tube 222 during operation.

During operation of the cooling tower 210, gas is ejected through the sparge ports 224 into the confined volume 270 between the outer wall of the gas inlet tube 222 and the inside wall of the weir 242 creating a mixture of gas and liquid within the confined volume 270 that is significantly reduced in bulk density compared to the average bulk density of the fluid located in the volume 271 outside of the wall of the weir 240. This reduction in bulk density of the gas/liquid mixture within confined volume 270 creates an imbalance in head pressure at all elevations between the surface 280 within evaporator vessel 230 and the first end 241 of the weir 240 when comparing the head pressure within the confined volume 270 and head pressure within the volume 271 outside of the wall of the weir 240 at equal elevations. The reduced head pressure within the confined volume 270 induces a flow pattern of liquid from the higher head pressure regions of volume 271 through the circulation gap 236 and into the confined volume 270. Once established, this induced flow pattern provides vigorous mixing action both within the confined volume 270 and throughout the volume 271 as liquid from the surface 280 and all locations within the volume 271 is drawn through the circulation gap 236 and upward through the confined volume 270 where the gas/liquid mixture flows outward over the second end 242 of the weir 240 and over the surface 280 confined within the evaporator vessel 230.

Within confined volume 270, the induced flow pattern and resultant vigorous mixing action creates significant shearing forces that are primarily based on the gross difference in specific gravity and hence momentum vectors between the liquid and gas phases at all points on the interfacial surface area of the liquid and gas phases. The shearing forces driven by the significant difference in specific gravity between the liquid and gas phases, which is, generally speaking, of a magnitude of 1000:1 liquid to gas, cause the interfacial surface area between the gas and liquid phases to increase significantly as the average volume of each discrete gas region within the mixture becomes smaller and smaller due to the shearing force of the flowing liquid phase. Thus, as a result of the induced flow pattern and the associated vigorous mixing within the confined area 270, the total interfacial surface area increases as the gas/liquid mixture flows upward within confined volume 270. This increase in interfacial surface area or total contact area between the gas and liquid phases favors increased rates of heat and mass transfer between constituents of the gas and liquid phases as the gas/liquid mixture flows upward within confined volume 270 and outward over the second end 242 of the weir 240.

At the point where gas/liquid mixture flowing upward within confined volume 270 reaches the elevation of the surface 280 and having passed beyond the second edge 242 of the weir 240, the difference in head pressure between the gas/liquid mixture within the confined volume 270 and the liquid within volume 271 fluid is eliminated. Absent the driving force of differential head pressure and having the confining effect of the wall of the weir 240, gravity and the resultant buoyancy of the gas phase within the liquid phase become the primary forces affecting the continuing flow patterns of the gas/liquid mixture exiting the confined space 270. The combination of the force of gravity and the impenetrable barrier created by the baffle 238 in the vertical direction eliminates the vertical velocity and momentum components of the flowing gas/liquid mixture at or below the elevation of the bottom of the baffle 238 and causes the velocity and momentum vectors of the flowing gas/liquid mixture to be directed outward through the gap 239 created by the second end 242 of the weir 240 and the bottom surface of the baffle 238 and downwards near the surface 280 within the evaporator vessel 230 causing the continuing flow pattern of the gas/liquid mixture to assume a predominantly horizontal direction. As the gas/liquid mixture flows outwards in a predominantly horizontal direction, the horizontal velocity component continually decreases causing a continual reduction in momentum and a reduction of the resultant shearing forces acting at the interfacial area within the gas/liquid mixture. The reduction in momentum and resultant shearing forces allows the force of buoyancy to become the primary driving force directing the movement of the discontinuous gas regions within the gas/liquid mixture, which causes discrete and discontinuous regions of gas to coalesce and ascend vertically within the continuous liquid phase. As the ascending gas regions within the gas/liquid mixture reach the surface 280 within the evaporator vessel 230, buoyancy causes the discontinuous gas phase to break through the surface 280 and to coalesce into a continuous gas phase that is directed upward within the confines of the evaporator vessel 230 and into the vapor exhaust duct 260 under the influence of the differential pressure created by the blower or blowers (not shown in FIG. 3) supplying gas to the cooling tower 210.

Figure 4:
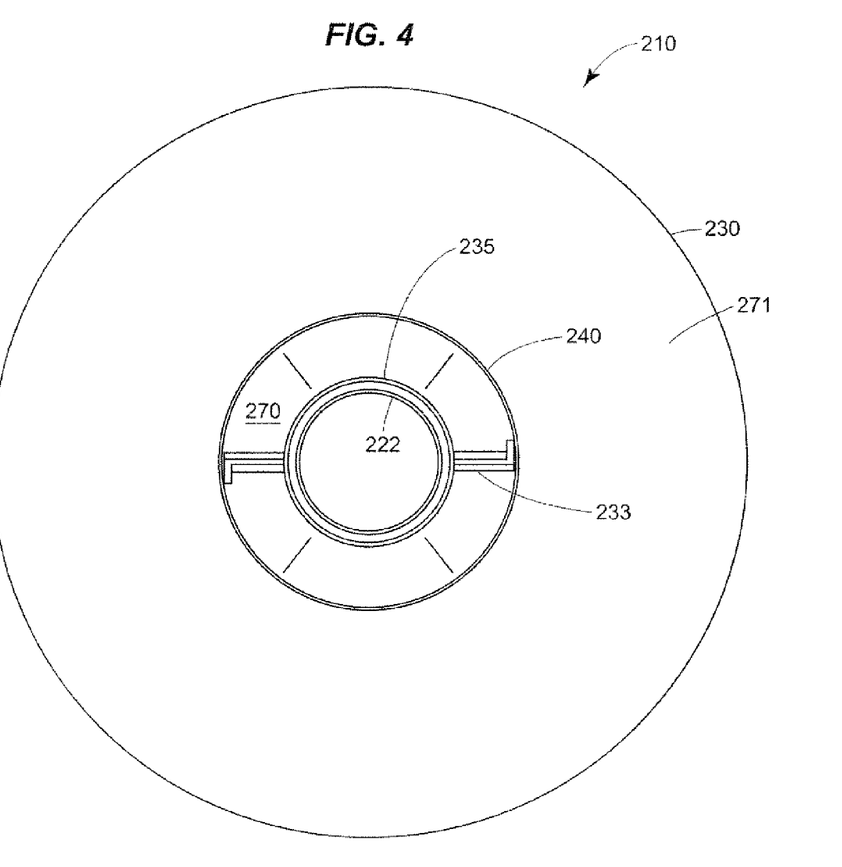
FIG. 4 is a top plan view of the cooling tower of FIG. 3.

FIG. 4 is a top plan view of the cooling tower 210 of FIG. 3 illustrating the tubular nature of the weir 240. Specifically, the generally circular gas inlet tube 222 is centrally located and is surrounded by the stabilizer ring 235. In this embodiment, the stabilizer ring 235 surrounds the gas inlet tube 222 and essentially restricts any significant lateral movement of the gas inlet tube 222 due to surging or vibration such as might occur upon startup of the system. While the stabilizer ring 235 of FIG. 4 is attached to the support brackets 233 at two locations, more or fewer support brackets 233 may be employed without affecting the function of the cooling tower 210. The weir 240, which surrounds the gas inlet tube 222 and the stabilizer ring 235, and is disposed co-axially to the gas inlet tube 222 and the stabilizer ring 235, is also attached to, and is supported by the support brackets 233. In this embodiment, the confined volume 270 is formed between the weir 240 and the gas inlet tube 222 while the second volume 271 is formed between the weir 240 and the cylindrical side wall of the evaporator vessel 230. As will be understood, in this embodiment, the introduction of the gas from the exit ports 224 of the gas inlet tube 220 causes water to flow in an essentially toroidal pattern around the weir 240.

Some design factors relating to the design of the cooling tower 210 illustrated in FIGS. 3 and 4 are summarized below and may be useful in designing larger or smaller cooling towers. The shape of the cross sectional area and length of the gas inlet tube is generally set by: the allowable pressure drop, the configuration of the evaporator vessel, the costs of forming suitable material to match the desired cross sectional area and the characteristics of the blower that is coupled to the cooling tower. However, it is desirable that the outer wall of the gas inlet tube 222 provides adequate surface area for openings of the desired shape and size of the sparge ports which in turn admit the gas to the confined volume 271. For a typical cooling tower the vertical distance between the top edge 242 of the weir 240 and the top edge of the sparge ports should be not less than about 6 inches and preferably is at least about 17 inches. Selecting the shape and, more particularly, the size of the sparge port 224 openings is a balance between allowable pressure drop and the initial amount of interfacial area created at the point where the gas is dispersed into the flowing liquid phase within confined volume 271. The open area of the sparge ports 224 is generally more important than the shape, which can be most any configuration including, but not limited to, rectangular, trapezoidal, triangular, round, oval. In general, the open area of the sparge ports 224 should be such that the ratio of gas flow to total combined open area of all sparge ports should at least be in the range of 1,000 to 18,000 acfm per $ft^2$, preferably in the range of 2,000 to 10,000 acfm/$ft^2$ and more preferably in the range of 2,000 to 8,000 acfm/$ft^2$, where acfm is referenced to the operating temperature within the gas inlet tube. Likewise, the ratio of the gas flow to the cross sectional area of the confined volume 270 ($CSA_{confined\ volume}$) should be at least in the range of 400 to 10,000 scfm/$ft^2$, preferably in the range of 500 to 4,000 scfm/$ft^2$ and more preferably in the range of 500 to 2,000 scfm/$ft^2$. Additionally, the ratio of the cross sectional area of the evaporator vessel 230 ($CSA_{vessel}$) to the cross sectional area of the confined volume 270 is preferably in the range from three to one (3.0:1) to two-hundred to one (200:1), is more preferably in the range from eight to one (8.0:1) to one-hundred to one (100:1) and is highly preferably in the range of about ten to one (10:1) to fourteen to one (14:1). These ratios are summarized in the table below. Of course, in some circumstances, other ratios for these design criteria could be used as well or instead of those particularly described herein.

TABLE 1

| Ratios | Preferred Embodiment | Acceptable Range | Preferred Range |
| --- | --- | --- | --- |
| Acfm:Total $CSA_{sparge\ ports}$ | 2,000-8,000 acfm/$ft^2$ | 1,000-18,000 acfm/$ft^2$ | 2,000-10,000 acfm/$ft^2$ |
| Scfm:$CSA_{confined\ volume}$ | 500-2,000 scfm/$ft^2$ | 400-10,000 scfm/$ft^2$ | 500-4,000 scfm/$ft^2$ |
| $CSA_{confined\ volume}$:$CSA_{vessel}$ | 10:1-14:1 | 3.0:1-200:1 | 8.0:1-100:1 |

Figure 5:
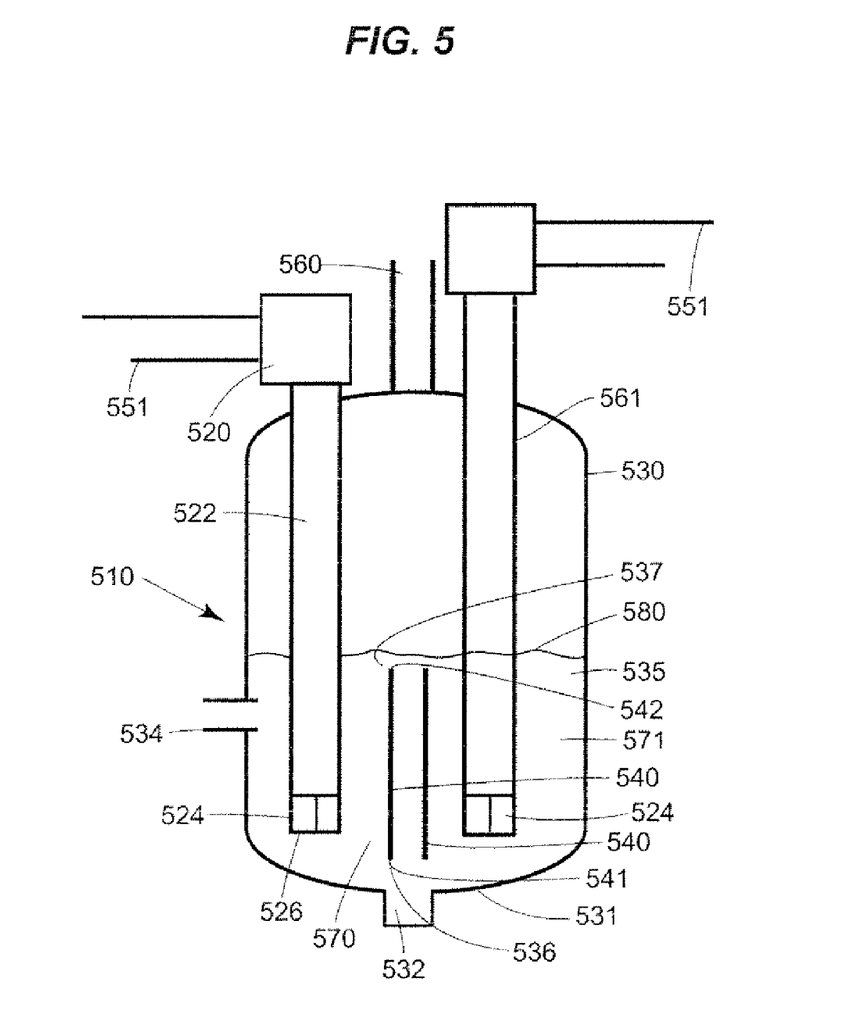
FIG. 5 is a cross-sectional view of a fifth cooling tower having multiple gas tubes and weirs.

The embodiment of a cooling tower shown in FIG. 5 includes multiple gas tubes 522 and multiple weirs 540. The evaporator vessel 530 may include more than one gas tube 522 and/or more than one weir 540 to increase cooling capability without a significant increase in the size of the cooling tower 510.

Figure 6:
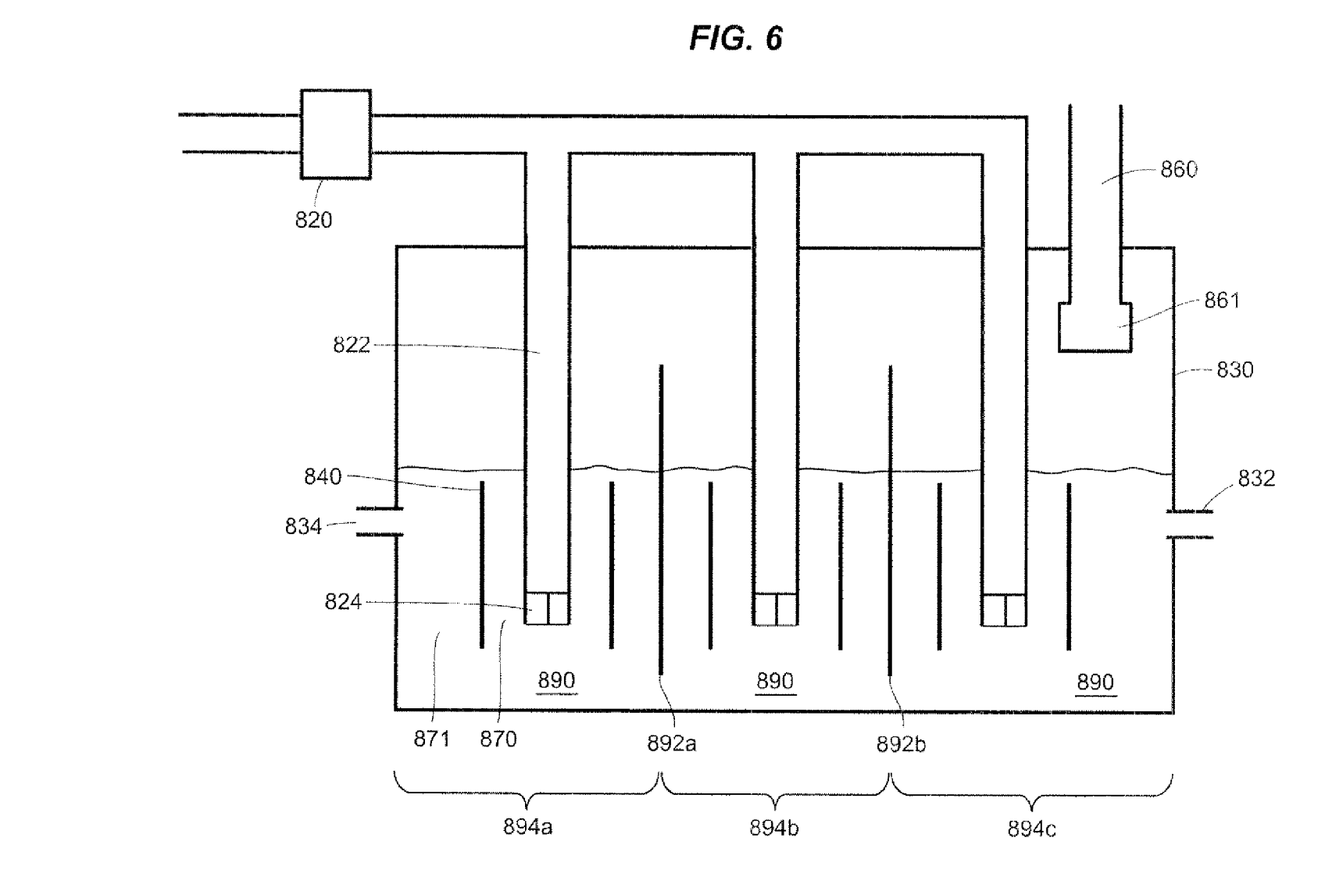
FIG. 6 is a cross sectional view of a sixth cooling tower having multiple cooling chambers within a single vessel.

The embodiment of a cooling tower shown in FIG. 6 includes multiple gas tubes 822 and multiple weirs 840 within a single vessel 830, like the embodiment shown in FIG. 5. However, the embodiment shown in FIG. 6 is arranged to provide sequential (multi-stage) cooling by having a series of baffles 892a, 892b that divide die vessel into three cooling chambers 894a, 894b, 894c. Of course, more or less than three cooling chambers may be used depending on the amount of space available and the required level of cooling.

Generally, the more cooling chambers 894a, 894b, 894c, the greater the cooling of die cooling fluid 890. The cooling fluid enters the vessel 830 into the first cooling chamber 894a. The cooling fluid 890 is then sequentially cooled in each subsequent cooling chamber 894b. 894c further reducing temperature in each cooling chamber 894a, 894b, 894c. The cooling fluid 890 is removed from the last cooling chamber 894c at its lowest level of temperature. The additional cooling accomplished in each chamber is due in part to the introduction of fresh gas into each cooling chamber 894a, 894b, 894c.

It will be understood that, because the weir and gas dispersion configurations within the cooling towers illustrated in the embodiments of FIGS. 1-6 provide for a high degree of mixing, induced turbulent, flow and the resultant intimate contact between liquid and gas within the confined volumes 70, 170, 270, etc., the cooling towers of FIGS. 1-6 create a large interfacial surface area for the interaction of the water and the gas provided via the gas inlet tube, leading to very efficient heat and mass transfer between gas and liquid phases. Furthermore, the use of the weir and, if desired, the baffle, to cause a predominantly horizontal flow pattern of the gas/liquid mixture at the surface of the fluid mixture mitigates or eliminates the entrainment of droplets of cooling liquid within the exhaust gas. Still further, the high degree of turbulent flow within the evaporator vessel mitigates or reduces the formation of large crystals or agglomerates and maintains the mixture of solids and liquids within the evaporator vessel in a homogeneous state to prevent or reduce settling of precipitated solids. This factor, in turn, reduces or eliminates the need to frequently clean the evaporator vessel and allows the evaporation process to proceed to a very high stale of concentration by maintaining precipitates in suspension. In the event that such solids do form, however, they may be removed via the outlet port 32 (FIG. 1) using a conventional valve arrangement. As known to those skilled in the art of operating cooling towers, removal (blowdown) of water and replacement with fresh (makeup) water at a controlled rate may be employed to maintain the level of solids within the water at a desirable equilibrium concentration of total suspended and/or dissolved solids.

While several different types cooling towers having different weir configurations are illustrated herein, it will be understood that the shapes and configurations of the components, including the weirs, baffles and gas entry ports, used in these devices could he varied or altered as desired. Thus, for example, while the gas inlet tubes are illustrated as being circular in cross section, these tubes could be of any desired cross sectional shape including, for example, square, rectangular, oval, etc. Additionally, while the weirs illustrated herein have been shown as flat plates or as tubular members having a circular cross-sectional shape, weirs of other shapes or configurations could be used as well, including weirs having a square, rectangular, oval, or other cross sectional shape disposed around a gas inlet tube, weirs being curved, arcuate, or multi-faceted in shape or having one or more walls disposed partially around a gas inlet tube, etc. Also, the gas entry ports shown as rectangular may assume most any shape including trapezoidal, triangular, circular, oval, or triangular. Furthermore, the weirs need not be solid surfaces and may be perforated or latticed if desired. Further, virtually any cooling fluid may be used in the cooling towers disclosed herein (e.g., anti-freeze solutions) instead of water.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A cooling tower comprising:
an evaporator vessel having an interior adapted to hold a warm liquid that is to be cooled in the evaporator vessel;
a gas tube disposed within the evaporator vessel and adapted to transport a cool gas into the interior of the evaporator vessel, the cool gas mixing with the warm liquid in the evaporator vessel allowing heat to transfer from the warm liquid to the cool gas;
a weir disposed within the evaporator vessel adjacent to the gas tube;
a gas exit port adapted to transport gas from the interior of the evaporator vessel;
a warm liquid inlet adapted to supply the warm liquid to the interior of the evaporator vessel; and
a level sensor and control that measures a level of the warm liquid within the evaporator vessel and controls a rate of warm liquid supplied into the evaporator vessel through the warm liquid inlet to maintain the warm liquid within the evaporator vessel at a predetermined operating level;
wherein the weir includes a first weir end and a second weir end and is disposed within the evaporator vessel to define a first liquid circulation gap between the first weir end and a first wall of the evaporator vessel and to define a second liquid circulation gap between the second weir end and a second wall of the evaporator vessel which enables warm liquid within the evaporator vessel to flow through the first and second circulation gaps when gas is introduced into the evaporator vessel from the gas tube, the second weir end being located at a level that is at or below the predetermined operating level of the warm liquid within the evaporator when gas is introduced into the evaporator vessel through the gas tube causing the warm liquid to flow over the second end of the weir.

2. The cooling tower of claim 1 further including a baffle disposed proximate the second circulation gap and generally perpendicular to the weir.

3. The cooling tower of claim 2, wherein the distance between the second weir end and the baffle is in the range of 1 to 20 inches.

4. The cooling tower of claim 2, wherein the baffle is attached to the gas tube.

5. The cooling tower of claim 1, wherein the gas tube includes a gas exit disposed below a surface of the warm liquid when the warm liquid is disposed within the evaporator vessel.

6. The cooling tower of claim 5, further including a plurality of gas exits disposed in the gas tube, wherein each gas exit is substantially rectangular in shape.

7. The cooling tower of claim 5, further comprising a blower attached to the gas tube, the blower supplying gas to the gas tube,
wherein a ratio of gas flow in actual cubic feet per minute (acfm) out of the gas tube as measured at the operating temperature of the gas flowing within the gas tube to a cross sectional area of gas exit slots in the tube is in the range of approximately 1,000 acfm/ft$^2$ to approximately 18,000 acfm/ft$^2$.

8. The cooling tower of claim 5, further comprising a blower attached to the gas tube, the blower supplying gas to the gas tube,
wherein a ratio of gas flow in actual cubic feet per minute (acfm) out of the gas tube as measured at the operating temperature of the gas flowing within the gas tube to a cross sectional area of gas exit slots in the tube is in the range of approximately 2,000 acfm/ft$^2$ to approximately 8,000 acfm/ft$^2$.

9. The cooling tower of claim 1, further including a reinforcing plate attached to the evaporator vessel and attached to the weir.

10. The cooling tower of claim 9, further including a stabilizer ring attached to the reinforcing plate and disposed between the gas tube and the weir.

11. The cooling tower of claim 1, wherein a volume between the weir and the gas tube is a confined volume.

12. The cooling tower of claim 1, further comprising a blower attached to the gas tube, the blower supplying gas to the gas tube,
wherein a ratio of gas flow in standard cubic feet per minute (scfm) out of the gas tube to a cross sectional area of the confined volume is in the range of approximately 500 scfm/ft$^2$ to approximately 4,000 scfm/ft$^2$.

13. The cooling tower of claim 1, further comprising a blower attached to the gas tube, the blower supplying gas to the gas tube,
wherein the ratio of gas flow in scfm out of the gas tube to a cross sectional area of the confined volume is in the range of approximately 500 scfm/ft$^2$ to approximately 2,000 scfm/ft$^2$.

14. The cooling tower of claim 11, wherein a ratio of a cross sectional area of the evaporator vessel to a cross sectional area of the confined volume is in the range of approximately 3 to 1 to approximately 200 to 1.

15. The cooling tower of claim 1, wherein the weir comprises a tubular member disposed around the gas tube.

16. The cooling tower of claim 15, wherein the tubular member is circular in cross section.

17. The cooling tower of claim 15, wherein the tubular member is disposed co-axial to the gas tube.

18. The cooling tower of claim 1, further including a blower attached to the gas tube.

19. The cooling tower of claim 1 further comprising a blower attached to the gas tube, the blower supplying gas to the gas tube,
wherein the blower supplies gas to the evaporation vessel under positive pressure.

20. The cooling tower of claim 1 further comprising an induction fan attached to the gas exit port, the induction fan drawing gas through the evaporation vessel under negative pressure.

21. The cooling tower of claim 1, further comprising a source of warm liquid connected to the warm liquid inlet and a source of cool gas connected to the gas tube,
wherein a temperature of the warm liquid in the source of warm liquid is greater than a temperature of the cool gas in the source of cool gas.

22. The cooling tower of claim 1, wherein liquid in a continuous phase flows through the first liquid circulation gap and the second liquid circulation gap, forming a toroidal liquid flow pattern around the weir.

23. The cooling tower of claim 2, wherein the baffle is attached to an interior wall of the evaporator vessel.

24. The cooling tower of claim 1, wherein the weir comprises a generally flat plate member.

25. The cooling tower of claim 24, wherein the generally flat plate member extends across the interior of the evaporator vessel between opposite sides of the evaporator vessel.

26. The cooling tower of claim 1 further comprising a demister to remove entrained liquid droplets from the gas before the gas exits the evaporation vessel.

27. The cooling tower of claim 26, wherein the demister is a vane-type demister.

28. The cooling tower of claim 26, wherein the demister is a mesh pad-type demister.

29. The cooling tower of claim 26, wherein the demister is a combination of a vane-type demister and a mesh pad-type demister.

30. The cooling tower of claim 26, wherein the demister is a vane-type demister having a coalescing filter.

31. The cooling tower of claim 1 further comprising a plurality of gas tubes.

32. The cooling tower of claim 1 further comprising a plurality of weirs.

33. The cooling tower of claim 1 further comprising a plurality of blowers.

* * * * *